H. M. SNYDER.
WHEEL RIM CONSTRUCTION.
APPLICATION FILED SEPT. 18, 1911.
1,107,719.
Patented Aug. 18, 1914.
2 SHEETS—SHEET 1.
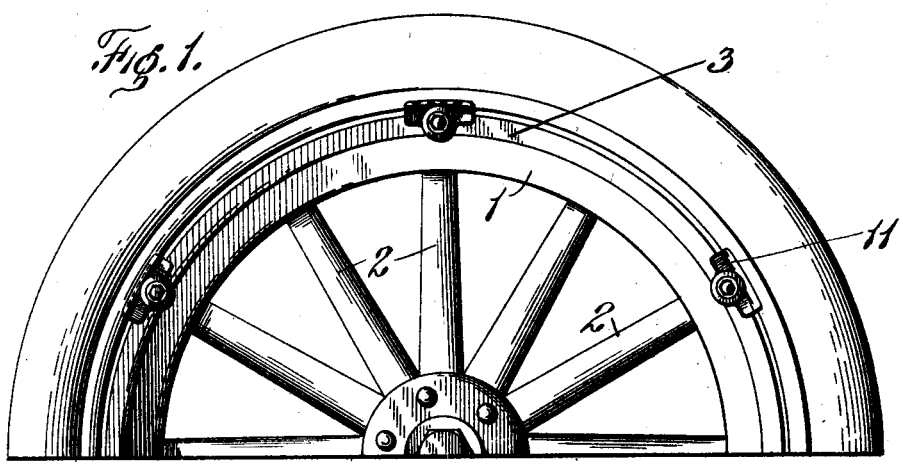
Fig. 1.
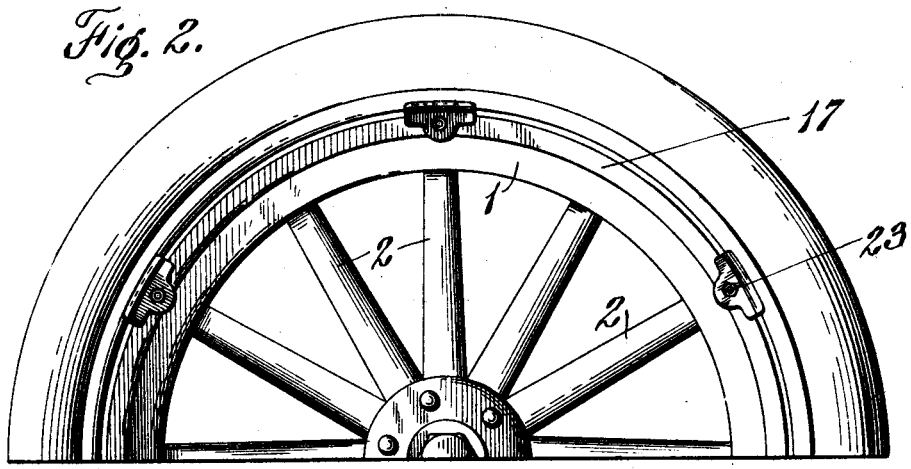
Fig. 2.
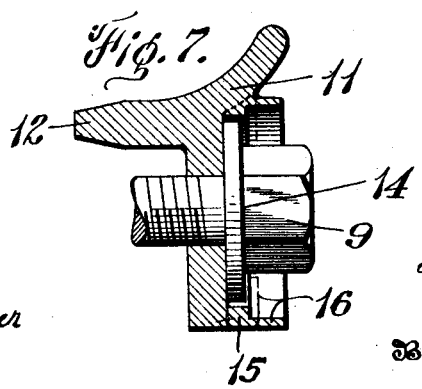
Fig. 7.
Witnesses
Chas. W. Stauffiger
Anna M. Dow
Inventor
Harry M. Snyder;
By 
Attorneys

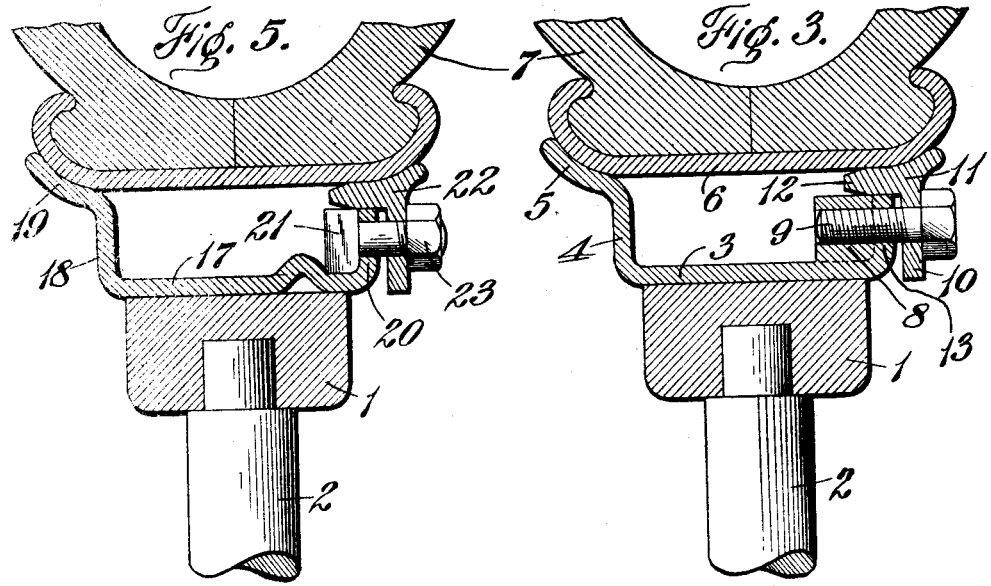
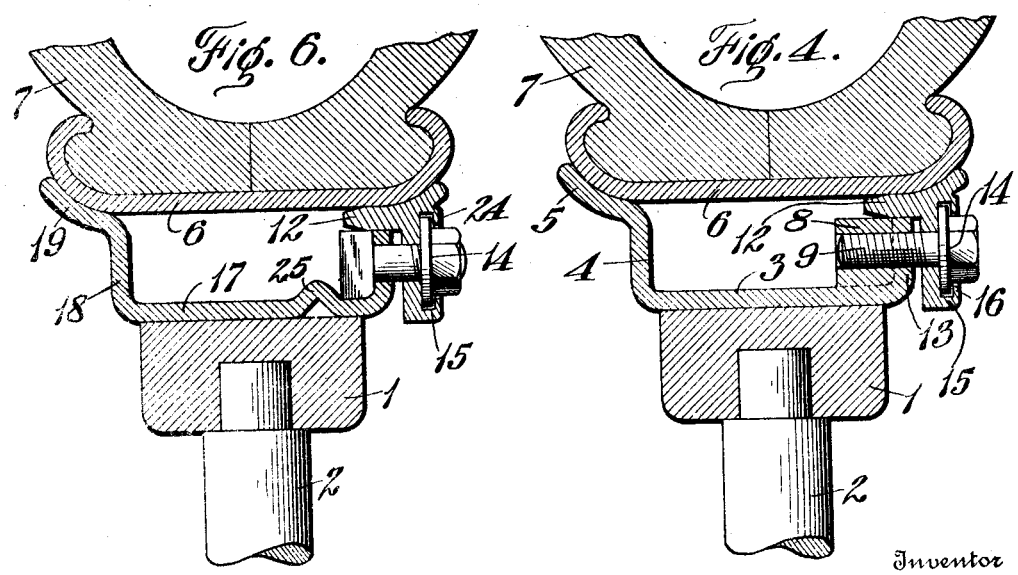

UNITED STATES PATENT OFFICE.

HARRY M. SNYDER, OF DETROIT, MICHIGAN, ASSIGNOR TO DETROIT DEMOUNTABLE RIM CO., OF DETROIT, MICHIGAN, A CORPORATION OF MICHIGAN.

WHEEL-RIM CONSTRUCTION.

1,107,719.  Specification of Letters Patent.  Patented Aug. 18, 1914.

Application filed September 18, 1911. Serial No. 649,856.

*To all whom it may concern:*

Be it known that I, HARRY M. SNYDER, a citizen of the United States of America, residing at Detroit, in the county of Wayne and State of Michigan, have invented certain new and useful Improvements in Wheel-Rim Construction, of which the following is a specification, reference being had therein to the accompanying drawings.

In wheel rim constructions of the demountable rim type, it is advisable that the parts be so disposed as to be applicable to an ordinary wheel felly without any cutting away of the felly for the reception of holding means.

This invention relates to a wheel rim construction whereby a wheel felly may be provided with demountable rim holding means without special preparation.

One object of the invention is the provision of means for removing the rim without the use of tools for breaking or prying apart rusted surfaces.

Another object of the invention is the simplicity and strength of construction.

The invention consists in the matters hereinafter set forth, and more particularly pointed out in the appended claim.

In the drawings, Figure 1 is a view in elevation of a portion of a wheel having a rim construction that embodies the invention; Fig. 2 is a view of a modification thereof; Fig. 3 is a view in section, enlarged, of the rim and holding means disclosed in Fig. 2; Fig. 4 is a view in detail showing another modification of the holding means for ready demounting of the parts; Fig. 5 is a view, enlarged and in section of the wheel rim construction disclosed in Fig. 2; Fig. 6 is a view in detail showing another modification for readily demounting the rim; and Fig. 7, is a view in cross section in detail, enlarged, of a rim shoe and cap screw ready for assembling.

Referring to the drawings, a wheel of standard construction has a felly 1 mounted on spokes 2 in the usual manner. A metal band 3 is shrunk on or otherwise secured around the periphery of the felly in the usual manner of a wheel tire and is provided at one margin with a flange 4 having a flared lip 5 that forms a seat for one margin of a demountable rim 6. The latter of any preferred type secures a tire 7 in the usual manner.

A series of holding bosses 8 are formed on the outer face of the band 3 at regular intervals to receive cap screws 9 that are transversely disposed to the felly band. The latter pass through the depending portion 10 of rim shoes 11 each having a face corresponding to the seat face of the lip 5 and adapted to coöperate therewith to center the rim 6 on the felly. A wedge extension 12 on each shoe bears against the boss 8 and coacts therewith to support the rim and force it to center. As a preferred form of construction the bosses 8 may be formed integrally with a stiffening flange 13 extending around the band 3. As a ready means for withdrawing the shoe from between the rim and bosses, the cap screws may each have a flanged head 14, as indicated in Figs. 4 and 7 that is loosely encircled by an annular rim 15 having an upper weakened portion 16 which may be bent down into the position shown in dotted lines in Fig. 7 to retain the cap screw so that when it is screwed out of the boss it draws the shoe with it.

As a modification of the construction, the felly 1 may be surrounded by a band 17, as indicated in Figs. 5 and 6 having a rim seat flange 18 with lip 19 on which the rim 6 rests. An annular stiffening flange 20 on the other margin of the band has holding apertures at regular intervals through which bolts 21 are passed through rim shoes 22, nuts 23 holding the shoes in place. The shoes may be retained by the nuts by inturned lips 24 indicated in Fig. 6 similar to the portion 16 of the cap screw construction and in such instance, a shoulder 25 is formed up on the face of the band 17 to prevent retrograde movement of the bolt. Such shoulder may be also used when the nut is not flanged as indicated in Fig. 5 although this is not necessary. As a result a rim construction is obtained that is readily applicable to any felly without mutilation or special fitting of the latter. Furthermore while the construction is simple and strong, it provides means for breaking rusted joints or readily demounting the outer rim without the use of special tools for prying the shoes out of position.

Obviously, changes in the details of construction may be made without departing from the spirit of the invention and I do not care to limit myself to any particular form or arrangement of parts.

What I claim is:—

A wheel rim construction comprising a band having a rim seat flange on one margin thereof, a stiffening flange and projections from its face near the other margin, rim shoes adapted to rest on the stiffening flange of the other margin of the band, a demountable rim adapted to be seated on the flange and shoes and to be retained by the latter when they are drawn between the stiffening flange and the rim, and means engaging the projecting portions adapted to draw the shoes between the stiffening flange and the rim for securing the latter in operative position.

In testimony whereof I affix my signature in presence of two witnesses.

HARRY M. SNYDER.

Witnesses:
A. M. SHANNON,
C. R. STICKNEY.